United States Patent
Oh et al.

(10) Patent No.: US 8,364,637 B2
(45) Date of Patent: Jan. 29, 2013

(54) FILE TRANSMISSION SYSTEM AND FILE MANAGEMENT METHOD THEREOF

(75) Inventors: Seoung Hoon Oh, Suwon-si (KR); Se Hyoung Park, Seoul (KR); Jong Yeon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 12/100,003

(22) Filed: Apr. 9, 2008

(65) Prior Publication Data
US 2009/0125483 A1 May 14, 2009

(30) Foreign Application Priority Data
Nov. 12, 2007 (KR) .................. 10-2007-0114842

(51) Int. Cl.
*G06F 7/00* (2006.01)
*G06F 17/00* (2006.01)
(52) U.S. Cl. ..................................... 707/621
(58) Field of Classification Search .............. 707/621, 707/999.2
See application file for complete search history.

(56) References Cited

U.S. PATENT DOCUMENTS

| 6,044,381 A * | 3/2000 | Boothby et al. ............ 1/1 |
| 6,725,239 B2 * | 4/2004 | Sherman et al. ............ 1/1 |
| 2002/0049764 A1 * | 4/2002 | Boothby et al. ............ 707/100 |
| 2006/0224620 A1 * | 10/2006 | Silverman et al. ......... 707/104.1 |

FOREIGN PATENT DOCUMENTS
JP 2006-012225 1/2006

* cited by examiner

*Primary Examiner* — Aleksandr Kerzhner
(74) *Attorney, Agent, or Firm* — Stanzione & Kim, LLP

(57) ABSTRACT

A file transmission system and a file management method thereof that is capable, when files are transmitted between devices, of allowing the user to determine whether to download a file having a delete history, among those files, so that an undesired file is not transmitted. The file transmission system includes a host device to provide content files, a user device connected to the host device, the user device receiving the content files provided from the host device, and a controller to search for a delete history of a file to be transmitted from the host device to the user device and determine whether to transmit the file to be transmitted, if the file to be transmitted has the delete history. Therefore, it is possible to efficiently manage files having delete histories.

9 Claims, 4 Drawing Sheets

FIG. 3

| field name | type | length | description |
|---|---|---|---|
| Genre | M_STR16 | variable(50) | genre |
| Artist | M_STR16 | variable(100) | singer |
| Album | M_STR16 | variable(50) | album |
| Title | M_STR16 | variable(256) | music title |

FILE TRANSMISSION SYSTEM AND FILE MANAGEMENT METHOD THEREOF

CROSS-REFERENCE TO RELATED APPLICATION

This application claims the benefit of Korean Patent Application No. 2007-114842, filed in the Korean Intellectual Property Office on Nov. 12, 2007, the disclosure of which is incorporated herein by reference.

BACKGROUND OF THE INVENTION

1. Field of the Invention

Aspects of the present invention relate to a file transmission system and a file management method thereof, and, more particularly, to a file transmission system and a file management method thereof wherein, when files are transmitted between devices, the file transmission is managed by determining whether to download a file having a delete history, among those files.

2. Description of the Related Art

A file transmission system is a system that transmits media content files between devices (for example, a host device and a user device) through download (or hot sync). Presently, as the capacity of devices increase, there is a need to download only a desired file from a host device to a user device through hot sync and to delete an undesired file among the downloaded files to manage the stored files. Further, for transmission of a file newly created by the host device to the user device, it may be necessary to re-download a combination of the newly created file with existing files from the host device to the user device through the hot sync.

However, if the files from the host device are re-downloaded through the hot sync, a file not desired by the user, namely, a file previously deleted by the user, is also re-downloaded, resulting in the user's trouble of having to again delete the undesired file after the downloading.

SUMMARY OF THE INVENTION

Aspect of the present invention provide a file transmission system that is capable, when files are transmitted between devices, of allowing the user to determine whether to download a file having a delete history, among those files, so that an undesired file is not transmitted.

Additional aspects of the present invention provide a file management method of a file transmission system that is capable of storing delete histories of files in a database of a device and, when a file is transmitted, searching the database for a delete history of the file to determine whether the file has the delete history, so as to efficiently manage files having delete histories.

According to an aspect of the present invention, a file transmission system is provided. The file transmission system comprises a host device to provide content files; a user device connected to the host device to receive the content files provided from the host device; and a controller to search for a delete history of a file to be transmitted from the host device to the user device and determine whether to transmit the file to be transmitted, if the file to be transmitted has the delete history.

According to another aspect of the present invention, the controller is provided in the host device or the user device.

According to another aspect of the present invention, Database (DB) information about currently stored files and DB information about deleted files is set in the user device.

According to another aspect of the present invention, the DB information is classified into basic information of the files and metadata of the files.

According to another aspect of the present invention, the controller compares information of the file to be transmitted with the DB information about the deleted files to determine whether the file to be transmitted has the delete history.

According to another aspect of the present invention, the file transmission system further comprises a display unit to provide a download confirmation message when the file to be transmitted has the delete history.

According to another aspect of the present invention, the file transmission system further comprises an input unit to confirm whether to transmit the file to be transmitted, according to the provided download confirmation message.

According to another aspect of the invention, a file transmission system is provided. The file transmission system comprises a first device to provide content files; and a second device connected to the first device to receive the content files provided from the first device; wherein the first device or the second device comprises a controller to search for a delete history of a file to be transmitted from the first device to the second device and to determine whether to transmit the file to be transmitted, if the file to be transmitted has the delete history.

According to another aspect of the present invention, database (DB) information about currently stored files and DB information about deleted files may be set in the first device or the second device.

According to another aspect of the present invention, the controller compares information of the file to be transmitted with the DB information about the deleted files to determine whether the file to be transmitted has the delete history, and confirms from a result of the determination whether to transmit the file to be transmitted.

According to another aspect of the invention, a file management method of a file transmission system is provided. The method comprises connecting devices with each other to transmit a content file between the devices; searching for a delete history of the file to be transmitted between the devices; and determining whether to transmit the file to be transmitted, if the file to be transmitted has the delete history.

According to another aspect of the present invention, the file management method further comprises setting database (DB) information about currently stored files and DB information about deleted files.

According to another aspect of the present invention, the searching for the delete history comprises comparing information of the file to be transmitted with the DB information about the deleted files to determine whether the file to be transmitted has the delete history.

According to another aspect of the present invention, the determining of whether to transmit the file to be transmitted comprises providing a download confirmation message when the file to be transmitted has the delete history; and confirming whether to transmit the file to be transmitted, according to the provided download confirmation message.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a table showing an arrangement of metadata fields of a music file among various media content files which are transmitted according to an embodiment of the present invention.

DETAILED DESCRIPTION OF THE EMBODIMENTS

Figure 1:
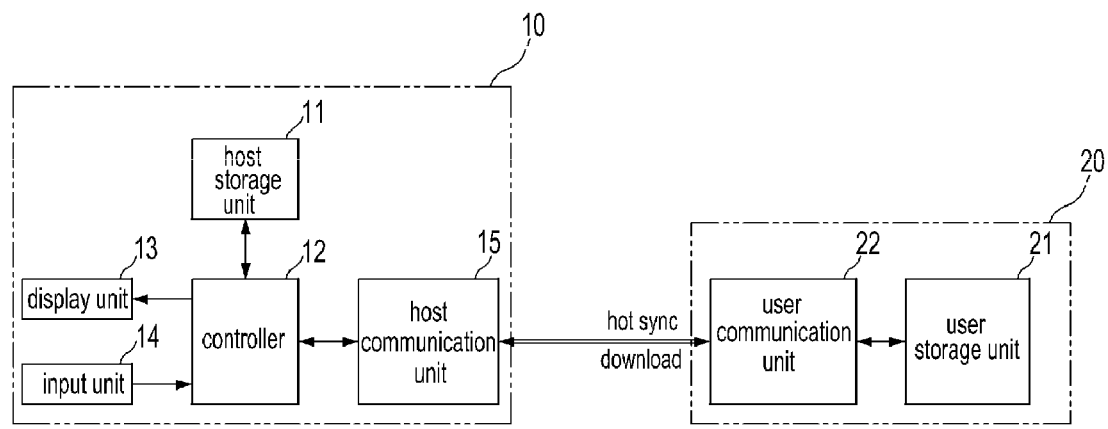
FIG. 1 is a block diagram showing the configuration of a file transmission system according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a configuration of a file transmission system according to one embodiment of the present invention. The file transmission system comprises a host device 10 to provide media content files and a user device 20 that is connected to the host device 10 to receive the media content files provided from the host device 10. Installed in each device 10 or 20 is an application capable of recognizing the other device 20 or 10 through a universal serial bus (USB) host function and then transmitting media content files to the other device 20 or 10 through a hot sync function. The function need not be USB in all aspects of the present invention; the function may be any communication function, including wireless (Bluetooth, Wi-Fi, ZigBee) and wired functions.

The host device 10 includes a host storage unit 11 to store media content files desired by the user, a controller 12 to control file transmission between the host device 10 and the user device 20, a display unit 13 to provide a download confirmation message in the process of the file transmission between the host device 10 and the user device 20, an input unit 14 to input a user command associated with the file transmission according to the download confirmation message provided by the display unit 13, and a host communication unit 15 for the file transmission with the user device 20. According to other aspects of the present invention, the host device 10 may include additional and/or other units. Similarly, the functionality of two or more of the above units may be integrated into a single component. The host device 10 may be, for example, a personal computer (PC), file server or portable multimedia player (PMP) that provides mass information.

The host storage unit 11 is a hard disk drive (HDD) or memory that stores media content files desired by the user in file or folder form. Newly created media content files are stored in the host storage unit together with the originally stored media content files.

The controller 12, when a file is to be transmitted from the host device 10 to the user device 20, searches delete histories of files stored in the user device 20 for a delete history of the file to be transmitted, to determine whether the file to be transmitted has a delete history. Upon determining that the file to be transmitted has a delete history, the controller 12 provides a download confirmation message through the display unit 13 to allow the user to determine whether to download the file to be transmitted. If the user inputs a download confirm command (download execution or cancellation) through the input unit 14 according to the download confirmation message provided through the display unit 13, then the controller 12 determines whether to transmit the file, in response to the confirm command.

The controller 12 compares information of a file to be transmitted from the host device 10 to the user device 20 with database (DB) information (information about delete histories of files) set in the user device 20 to determine whether the file to be transmitted has a delete history. If the file to be transmitted has a delete history, the controller 12 performs a control operation such that the user determines whether to download the file to be transmitted. The controller 12 may also provide a function to determine whether to transmit all files stored in the host storage unit 15 or to select and transmit files in a specific folder. Through this function, the controller 12 can perform a file selection operation in various ways in response to setting commands from the user device 20.

The display unit 13 provides the download confirmation message on a setting screen through the use of a graphic user interface (GUI) in the process of the file transmission between the host device 10 and the user device 20. The input unit 14 inputs a user command associated with the file transmission according to the download confirmation message provided by the display unit 13 using a specific button or GUI. The user command may be, for example, a command that requests transmission of a specific media content file desired by the user from the host device 10 to the user device 20. The host communication unit 15 transmits, to the user device 20, media content files stored in the host storage unit 11 in file or folder form.

The user device 20 includes a user storage unit 21 to receive and store media content files provided from the host device 10, and a user communication unit 22 for the file transmission with the host device 10. The user device 20 may be, for example, a PMP, an MP3 player, or a memory stick having a large-capacity storage medium.

The PMP usable as the host device 10 or user device 20 is a portable multimedia player. This PMP has a video playback function and a digital camera function, as well as a music playback function, while having the same basic structure as that of the MP3 player. The PMP can play back video, whereas the MP3 player generally only plays back music. The PMP has been commercially available from 2004 and been made to be smaller than the human palm so as to be easy to carry. At present, owing to addition of various functions, the PMP has a size on the order of the human palm. At the early stage of the PMP, a liquid crystal display (LCD) screen of about 3.5 inches was installed. This screen has been enlarged due to continuous upgrading of mechanisms. Nowadays, owing to function upgrading, an electronic dictionary function, digital multimedia broadcasting (DMB) function, navigation function, etc. may be provided in addition to the MP3 player function, video playback function and digital camera function. These functions are merely examples of the functions that may be available on the host device 10 or the user device 20; other functions may also be provided.

The MPEG audio layer 3 (MP3) of the MP3 player usable as the user device 20 is a kind of file format. The Motion Pictures Expert Group (MPEG) is a working group of the International Standards Organization associated with motion pictures, and comes into widespread use as a term indicating international standards defined thereby. An audio compression technique separated from the first standard defined by the MPEG, MPEG1, is the MPEG audio layer. The MPEG audio layer is divided into three layers according to compression rates and data structures, and the layer 3 is the MP3.

The memory stick usable as the user device 20 is a flash memory type recording medium developed by Sony in Japan for transfer of data in multimedia devices such as digital cameras, portable MP3 players, and camcorders. This memory stick is simple and convenient to carry because it is shaped as a small stick whose width, length, and thickness is 50×21.5×2.8 mm. Other types of memory may be used as well.

The user device 20 having various types of large-capacity storage media as stated above sets DB information about media content files transmitted from the host device 10. Where there is compatibility in DB fields between the user device 20 and the host device 10, a comparison may be made based on the DB information.

The user storage unit 21 is an HDD or memory to which a DB (for example, OracleLite, SQLCE, or AceDB developed by Samsung SW Laboratory) is applied for management of media content files as devices are currently advanced toward large capacities. The user storage unit 21 stores DB information about deleted files (delete history information of the files), as well as DB information about currently stored files, such that a file not desired by the user is not re-transmitted when media content files from the host device 10 are transmitted.

The user storage unit 21 sets the storable capacity of DB information about deleted files to a certain value like a waste basket function, and then deletes the DB information beginning with DB information of the oldest file (delete history information of the file) using a First In First Out (FIFO) system from the moment that the total DB information capacity exceeds the set value. The FIFO system is a data input/output system where data first stored in a data table is first outputted. Other systems may be employed as well.

The user communication unit 22 receives media content files stored in the host storage unit 11 of the host device 10 in file or folder form. A large amount of DB information may be required to determine whether a file to be currently transmitted is the same as a file deleted from the user storage unit 21.

Figure 2:
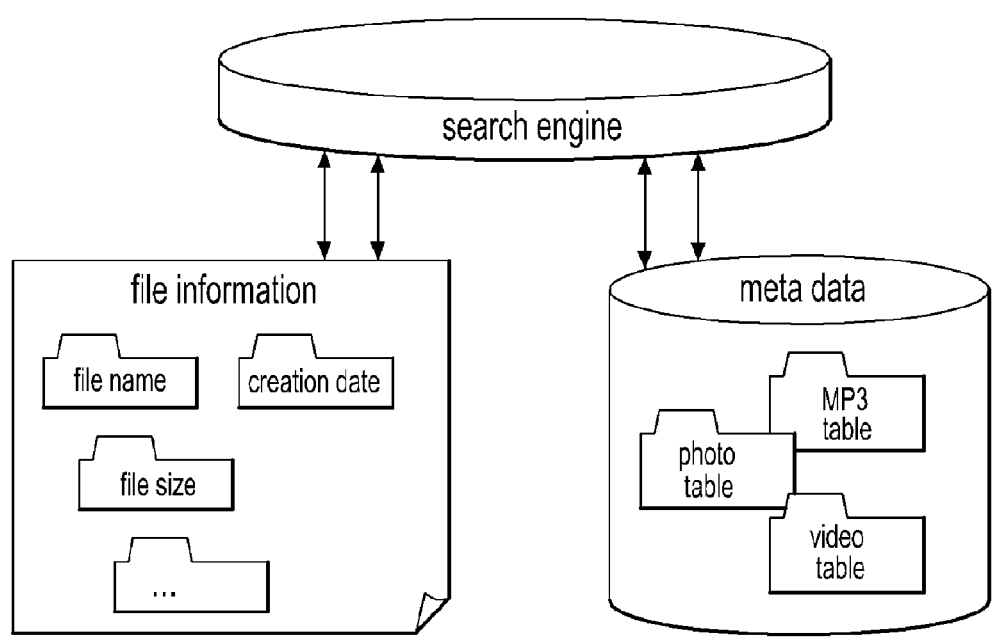
FIG. 2 is a view showing a classification of database search structures of media content files which are transmitted according to an embodiment of the present invention.

FIG. 2 shows a classification of DB search structures of media content files which are transmitted according to an embodiment of the present invention. The DB search structures of the media content files are broadly classified into two types, basic information of the files (file names, creation dates, file sizes, etc.) and metadata of the files (video data, photo data, MP3 data, etc.). This classification makes it possible to reduce a time required to search for files having delete histories in the process of file transmission.

When determining whether a file to be currently transmitted is the same as a deleted file using the basic information, the search for the file to be transmitted can be rapidly performed, but the accuracy thereof may be low. In contrast, when determining whether a file to be currently transmitted is the same as a deleted file, the search accuracy may be high using the metadata, but the search time may be longer than that based on the basic information because the metadata of the file to be transmitted must be extracted. In the DB search structures of FIG. 2, as an option, the user may set comparison conditions (a basic information search, metadata search, and basic information/metadata search) in the process of the file transmission.

Some examples of metadata fields by media are as follows, and can be arranged and used according to device characteristics. Various fields may be added depending on DB performance.

Music: ID3, Mood
Photo: Exif, Thumbnail, Color, Composition
Video: Segment

FIG. 3 is a table showing an arrangement of the most often used metadata fields of a music file among various media content files which are transmitted according to aspects of the present invention.

Figure 4:
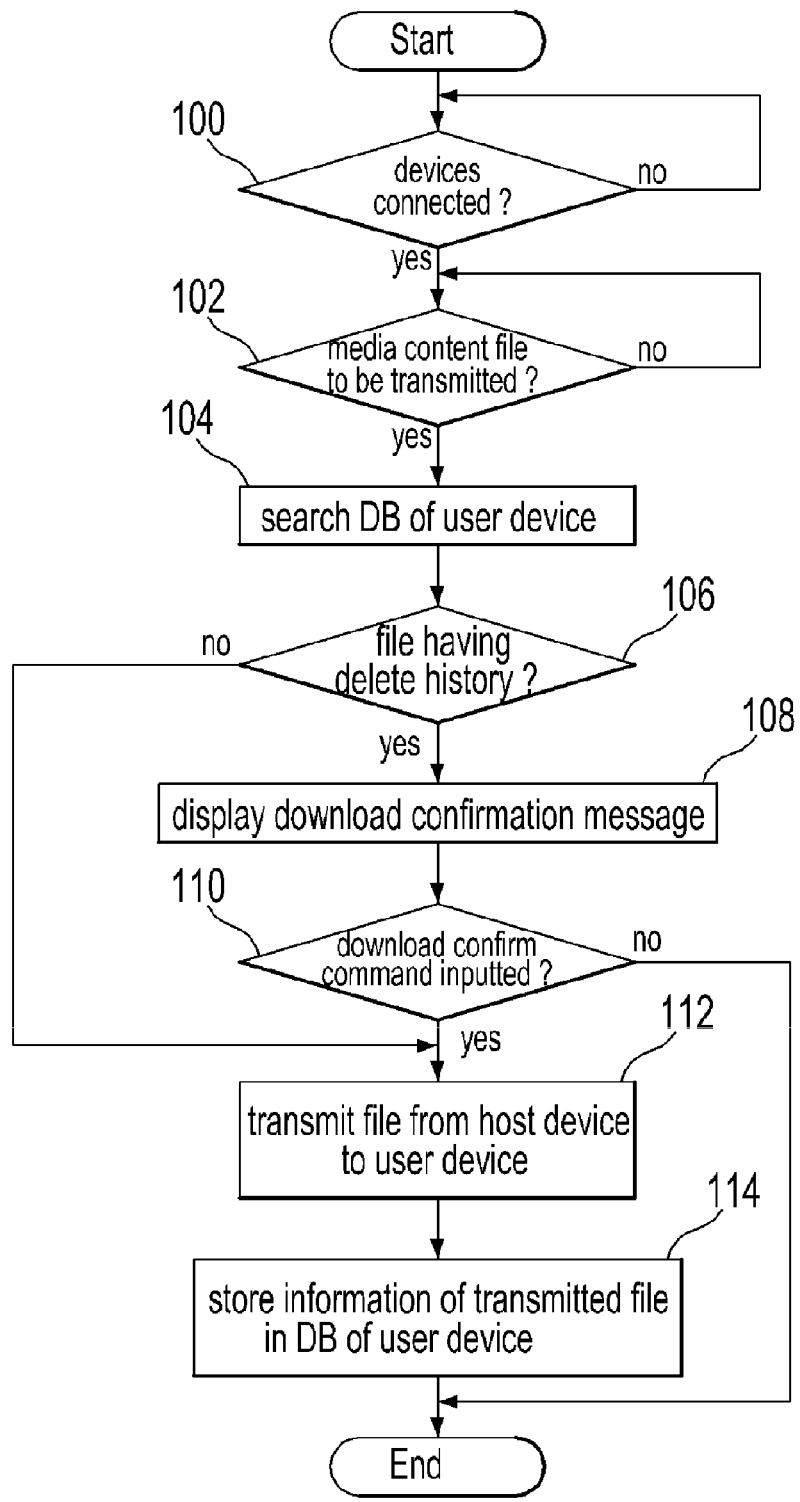
FIG. 4 is a flowchart illustrating a file management method of a file transmission system according to an embodiment of the present invention.

FIG. 4 is a flowchart of a file management process of a file transmission system according to an embodiment of the present invention. If the host device 10 which provides mass information and the user device 20 which has a large-capacity storage medium are communicably connected with each other in operation 100, each of the host device 10 and user device 20 recognize the other device through a USB host function (or other function) and then transmit media content files to the other device 20 or 10 through a hot sync function.

The controller 12 determines whether to transmit a specific media content file, stored in the host storage unit 11 of the host device 10 in file or folder form, to the user device 20 in operation 102. When the specific media content file from the host device 10 is to be transmitted to the user device 20, the controller 12 searches for DB information about deleted files (delete history information of the files), as well as DB information about files currently stored in the user storage unit 21 of the user device 20 in operation 104.

The controller 12 determines from the search results whether the file to be transmitted has a delete history in operation 106 and, upon determining that the file to be transmitted has the delete history, provides the download confirmation message through the display unit 13 to allow the user to determine whether to download the file to be transmitted in operation 108.

Subsequently, the controller 12 determines whether the user has input a download confirm command (for example, a download execution command) through the input unit 14 according to the download confirmation message provided through the display unit 13 in operation 110. If the user inputs the download confirm command, then the controller 12 transmits the specific media content file from the host device 10 to the user device 20 in operation 112.

If the specific media content file to be transmitted has no delete history, the controller 12 transmits the specific media content file from the host device 10 to the user device 20 directly without download confirmation in operation 112. After the specific media content file is transmitted from the host device 10 to the user device 20, the user device 20 sets DB information of the transmitted file in the user storage unit 21 in operation 114.

If the user has not inputted the download confirm command, the controller 12 recognizes that the user does not want to download the specific media content file, and thus ends the entire process without downloading.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CDs, DVDs, magnetic tapes, floppy disks, and optical data storage devices. Aspects of the present invention may also be embodied as carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As is apparent from the above description, according to the file transmission system and file management method thereof according to aspects of the present invention, delete histories of files are stored in a database of a device and, when a specific file is transmitted between devices, the database is searched for a delete history of the specific file to determine whether the specific file has the delete history. When the specific file has the delete history, the user is allowed to determine whether to download the specific file. In this manner, transmission of an undesired file is managed. Therefore, it is possible to remove the user's trouble of having to again delete the undesired file, so as to contribute to the convenience of the user. It is also possible to efficiently manage existing files and a newly created file.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A file transmission system comprising:
a host device to provide content files; and
a user device connected to the host device to receive the content files provided from the host device,
wherein the host device comprises a controller to search delete histories of the content files stored in the user device for a delete history of a file to be transmitted and to provide a download confirmation message to determine whether to download the file to be transmitted when the file to be transmitted has the delete history.

2. The file transmission system according to claim 1, wherein database (DB) information about currently stored files and DB information about deleted files is set in the user device.

3. The file transmission system according to claim 2, wherein the DB information is classified into basic information of the files and metadata of the files.

4. The file transmission system according to claim 2, wherein the controller compares information of the file to be transmitted with the DB information about the deleted files to determine whether the file to be transmitted has the delete history.

5. The file transmission system according to claim 4, further comprising a display unit to provide a download confirmation message when the file to be transmitted has the delete history.

6. The file transmission system according to claim 5, further comprising:
an input unit to confirm whether to transmit the file to be transmitted, according to the provided download confirmation message;
wherein the controller transmits the file to be transmitted based on a confirmation signal received from the input unit.

7. A file transmission system comprising:
a first device to provide content files; and
a second device connected to the first device to receive the content files provided from the first device;
wherein the first device comprises a controller to search delete histories of the content files stored in the second device for a delete history of a file to be transmitted and to provide a download confirmation message to determine whether to download the file to be transmitted when the file to be transmitted has the delete history.

8. The file transmission system according to claim 7, wherein DB information about currently stored files and DB information about deleted files is set in any one of the first or second device.

9. The file transmission system according to claim 8, wherein the controller compares information of the file to be transmitted with the DB information about the deleted files to determine whether the file to be transmitted has delete history, and confirms from a result of the determination whether to transmit the file to be transmitted.

* * * * *